June 9, 1931. J. J. BUCKLEY 1,809,019
ROTARY CUTTING OPERATIONS AND APPARATUS THEREFOR
Filed Feb. 18, 1925 2 Sheets-Sheet 1
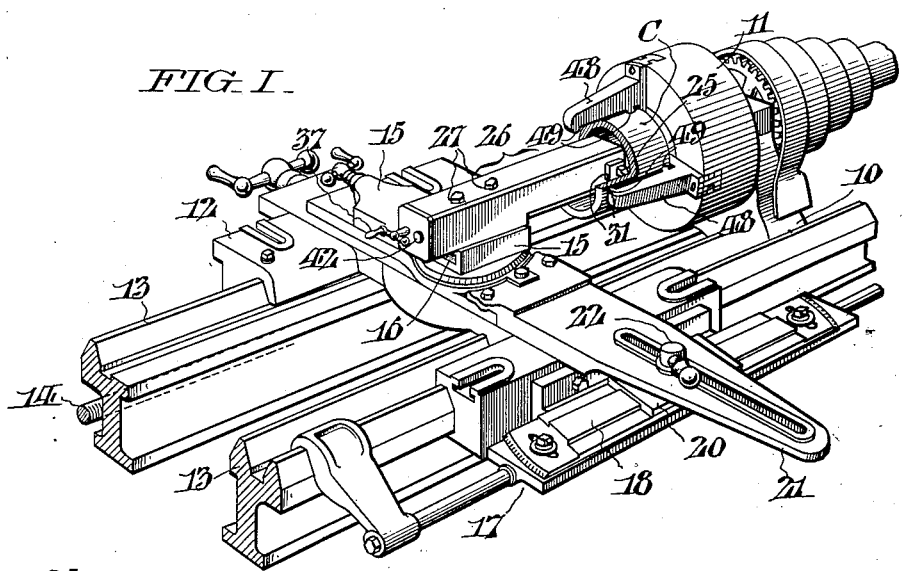
FIG. I.
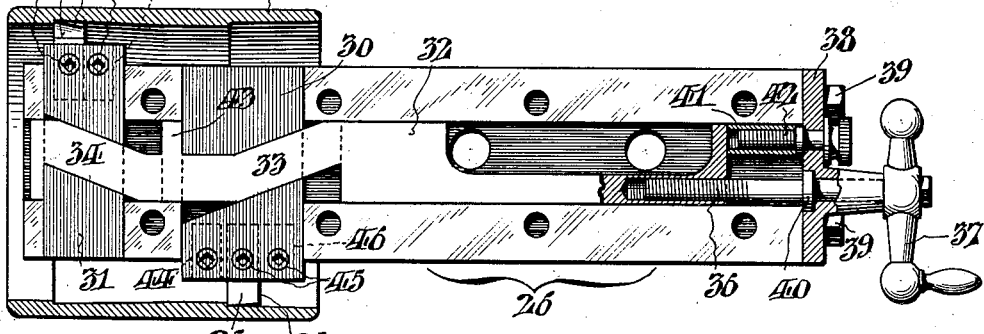
FIG. II.
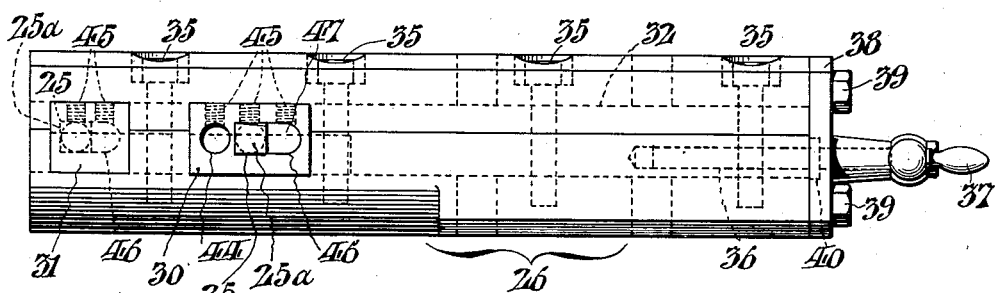
FIG. III.
WITNESSES
Alfred E. Aschinger
Thomas W. Kerr, Jr.
INVENTOR:
John J. Buckley,
BY Fraley Paul
ATTORNEYS.

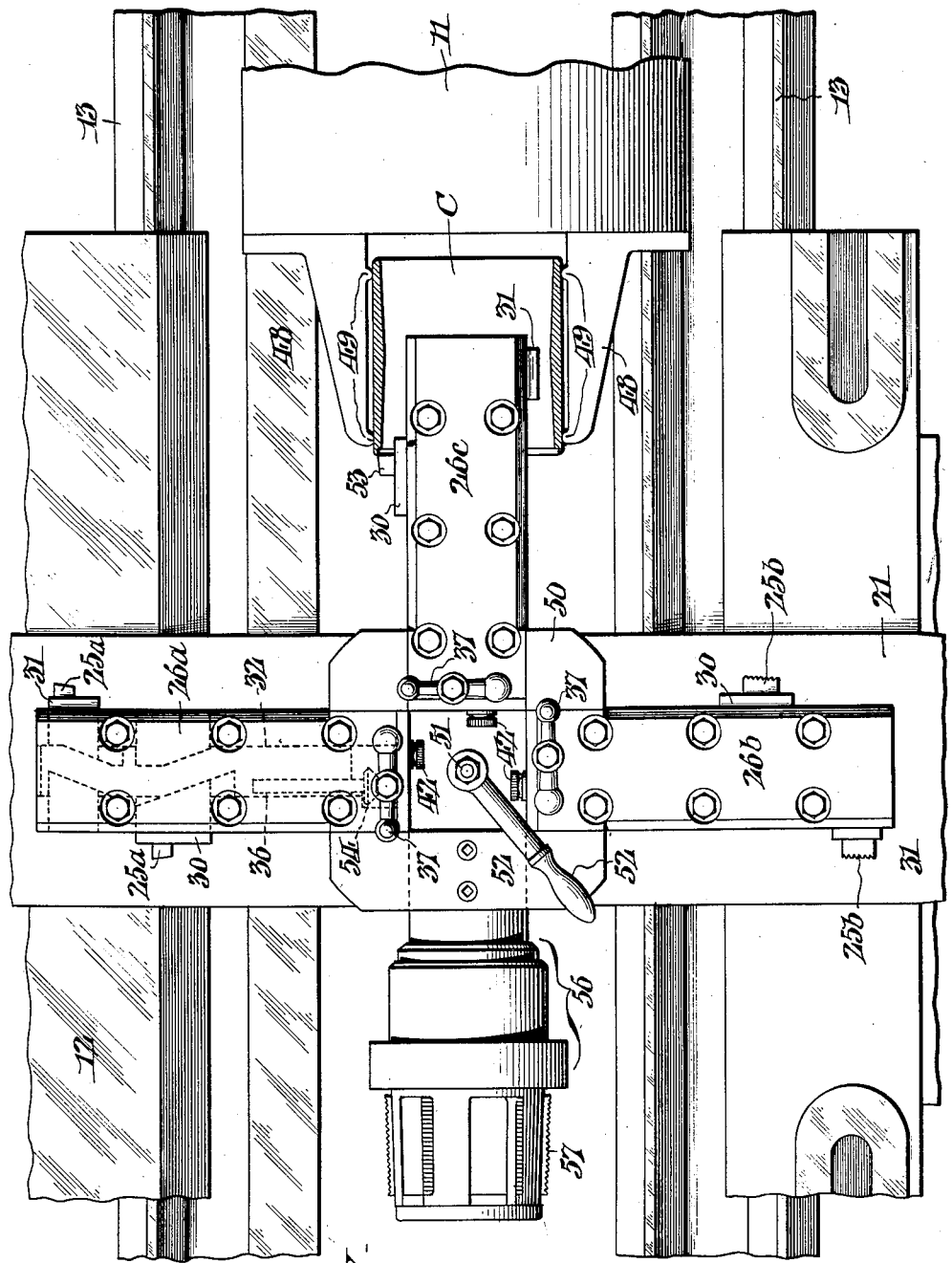

Patented June 9, 1931

1,809,019

UNITED STATES PATENT OFFICE

JOHN J. BUCKLEY, OF CHESTER, PENNSYLVANIA

ROTARY CUTTING OPERATIONS AND APPARATUS THEREFOR

Application filed February 18, 1925. Serial No. 9,929.

My invention relates to rotary cutting operations and the like, such as boring, threading, and otherwise finishing pipe couplings, etc. The invention is especially convenient and advantageous in the case of "sleeve" couplings for large sizes of steel pipe, such as used for oil well casings, for example. It includes both novel manufacturing methods, and novel apparatus and appliances for carrying out such methods advantageously. I aim to improve, expedite, and cheapen operations such as here indicated, and to minimize losses in the way of ruined work.

Sleeve couplings such as hereinbefore mentioned commonly consist of tubular forgings, internally threaded to take the threaded ends of the pipe lengths that they are to connect. In general, the threaded pipe ends are externally tapered, and the coupling sleeve has a corresponding internal taper from either end. The coupling sleeve is not forged with such a taper, however, any more than with screw threads: on the contrary, both taper and threads are cut in the forged sleeve in a machine shop, by means of a lathe or other suitable machine. Usually, also, the end of the coupling sleeve is internally chamfered or counter-bored to a larger diameter than that at the bottom of the screw-threads, to protect the beginning of the threads and facilitate engagement of the pipe end with them.

For the operations above indicated, the blank forging is held clamped by one end in a revolving work-holder, and suitable tools or cutters are employed to bore out its other (exposed) end to the proper taper, to chamfer or counter-bore it, and to thread it. When one end of the blank has been operated on, it is turned end for end and reclamped in the holder, and the other end then operated on. As some time is required to set up and adjust the different tools employed for boring, counter-boring, and threading, and as the setting and adjustment would necessarily be lost if one tool were substituted for another in a machine, it is customary to perform the various operations in different machines, each kept set up with one tool until an entire batch or lot of similar couplings has been run through it.

The disadvantage of thus using some three machines on one job (especially if it be a small job) is quite obvious. However, the method above outlined is subject to much more serious drawbacks.

While the tapered threads in the two ends of a coupling must be substantially or very approximately coaxial, so that the pipe lengths connected by them shall be in proper axial alignment, such forgings are seldom or never truly circular,—or even uniform from end to end,—either internally or externally. Not only, therefore, is it often rather hard to center a coupling satisfactorily in the work-holder for boring the first end; but after one end has been bored, the workman often fails to center the coupling satisfactorily for the boring of its other end, so that the two taper borings shall be in proper alignment. Sometimes this failure is due to unskillfulness or error of judgment; in other cases, the irregularities of the forging are such that if aligned with the first boring, the second would leave the walls of the coupling too thin somewhere. At best, the centering of the coupling in the work-holder is a tedious cut-and-try operation, generally consuming a good deal of time.

As a result of these difficulties, many couplings have to be rejected by inspectors after considerable machine work has been done on them; and thus the machinist's time on them becomes a dead loss, as well as the forging itself. Even in good shops, such losses average from 40 to 50 per cent. of the forged blanks worked on; hence it is a serious item in the real cost of the usable couplings turned out.

My invention affords a means of obviating such drawbacks of present practice, greatly reducing the time required to bore and thread couplings, assuring proper alignment as between the two ends of a coupling, without trouble or loss of time in centering, and avoiding or minimizing losses from imperfect centering or from mis-alignment. It can be carried out with standard machines, such as are already in use for boring and threading couplings, practically without alteration of such machines. It even allows all the operations of boring, chamfering or counter-boring, and threading to be done on a single machine, with greater convenience and rapidity than is possible when separate machines are employed as at present. For the convenience of those desiring to practice the invention, I have hereinafter illustrated and described suitable apparatus and methods for the purpose in connection with an ordinary type of screw-cutting engine lathe.

In the drawings, Fig. I is a fragmentary perspective view of the head-stock, bed, and associated parts of a screw-cutting engine lathe, illustrating its employment for the purpose of my invention, and showing a coupling being operated on partly broken away and in longitudinal mid-section.

Fig. II is a plan view of a boring bar shown in Fig. I, with certain parts removed and others partly broken away and in section.

Fig. III is a side view of the boring bar.

Fig. IV is a fragmentary plan view illustrating the employment of an engine lathe to perform various operations without necessity for changing tools.

Fig. I illustrates a lathe of ordinary type and construction, comprising head-stock 10, revolving work-holder 11 in the form of a three-jaw universal chuck (preferably of pneumatic type), carriage 12 slidable along ways 13 extending parallel with the axis of rotation of the work holder 11, as usual, and lead-screw 14 for feeding the carriage 12 along the ways 13 at uniform rate, as for screw-cutting. The carriage 12 is shown equipped with the usual compound rest 15, shiftable thereon angularly and also transversely of the ways 13. As shown, the rest 15 has the usual undercut groove 16 for the attachment of a tool post or the like thereto. The lathe is shown equipped with a standard type of taper attachment 17, comprising a guide 18 angularly adjustable to any desired inclination relative to the ways 13, a grooved slide block 20 engaging the guide 18, and a connection from the slide 20 to the rest 15 including a slotted member 21 and a screw clamp 22 for securing the member 21 to the slide 20, so that the rest 15 may have any desired range of movement relative to the carriage 12.

It will be seen that with suitable adjustment of the guide 18, the rest 15 can be fed transversely of the ways 13 in any desired ratio to the movement of the carriage 12 along them; or, in other words, the rest 15 can be fed obliquely along and transversely of the ways 13 (and of the axis of rotation of the work-holder 11) at any desired angle.

In order to secure the various advantages above explained, I provide for operating on the two ends of the coupling C in the work-holder 11 concurrently. For this purpose, I prefer to employ tools 25, 25 (see also Fig. II) suitably spaced in the direction of the axis of rotation of the work holder 11 and moving in the same direction therealong (toward the left in Fig. II), preferably at opposite sides of the axis of rotation. While such oppositely pointing tools 25, 25 on a common rest or carrier 15 need not necessarily be in a common horizontal axial plane, as shown, yet they should, of course, occupy such positions on the carrier 15 that their radial distances from the work holder axis vary oppositely as the carrier moves along and across the lathe ways 13, 13. With this arrangement, one tool 25 begins at the outer end of the coupling C and cuts on a diminishing taper inward from the outer end (speaking with reference to the relations of the coupling C to the work-holder 11) toward the middle of the coupling, while the other tool 25 begins about at (or outside of) the middle of the coupling C and cuts on an enlarging taper inward toward the inner end of the coupling, all as indicated in Fig. II. Accordingly, the two cutters 25, 25 move along paths that define oppositely expanding (conical) surfaces of revolution in the two ends of the revolving coupling. As shown in Figs. I and II, the tools 25, 25 are carried by a boring-bar 26 which is clamped by bolts 27, 27 to the rest 15, in place of the usual tool post or the like. After the ends of the coupling have been bored out tapering with cutters 25, 25 such as shown at 25a in Figs. II, III and IV, these cutters may be replaced with chasing cutters such as shown at 25b in Fig. IV, and the two ends of the coupling concurrently threaded in a similar manner, without necessity for disturbing the setting of the coupling in the work holder. The oppositely tapered threads thus formed in the opposite ends of the coupling C are truly coaxial and similar to one another. The ends of the coupling C may then be chamfered or counter-bored as usual, and also tapped, if desired, to finish and perfect their threads.

Owing to the pressure necessarily exerted by the work C on the tools 25, 25 during their cut, they tend to touch and scrape the metal if returned past it by reverse movement in the same path. To obviate necessity of revolving the work C and slowly backing the cutters 25, 25 out of it in order to avoid mutilation of the work in the withdrawal, I prefer to provide for retracting the cutters oppositely at the end of their working cut, so as to make them clear the work C completely and to allow the bar 26 to be withdrawn from the work without any necessity for revolving the latter.

For this purpose, the cutters 25, 25 may be mounted in holders 30, 31 shiftable across the bar 26 in transverse guideways, by means of an actuating member 32 movable lengthwise of the bar in a corresponding guideway or channel in the bar. As shown in Fig. II, the member 32 has oppositely inclined cam portions 33, 34 which engage in correspondingly inclined lateral grooves in the cutter holders 30, 31, and thus shift them oppositely and concurrently in or out of the bar 26 when the member 32 is moved one way or the other lengthwise of the bar. As here shown, the bar 26 is constructed in upper and lower halves clamped together by bolts 35, and the guideways for the parts 30, 31, and 32 are formed partly in the upper and partly in the lower halves of the bar. The actuating member 32 may be shifted as desired by means of a feed screw 36 provided with an operating handle crank 37. The screw 36 is rotatable in a bearing on a plate 38 removably secured to the end of the bar 26 by bolts 39, but is kept from being pushed outward through the plate by a collar or flange 40. A stop 41 similarly adjustable by means of a screw 42 similarly mounted in the plate 38 cooperates with the end of the member 32 to determine the normal cutting position of the cutters 25, 25,—the adjustment taking care of variations in sizes of couplings within the capacity of the tool. A stop lug 43 on the member 32 between the cutter holders 30, 31 coacts with the latter to limit the possible range of movement of the member 32 and of the cutter holders.

As shown in Figs. II and III, the holder 30 has a round socket-hole 44 to take a round cutter shank, with a key-socketed set screw 45 for securing the latter, and also a horizontally elongated round-sided "double" socket 46 with a pair of set-screws 45, 45 for securing a round cutter shank and a spacing block 47 with convex and concave sides corresponding in curvature to the sides of the socket and of the cutter shank. The holder 31 has a similar double socket 46. Thus the cutters 25, 25 can be mounted in practically any relative positions desired along the bar 26, according to the requirements of different couplings.

The work-holder ordinarily used for boring and threading couplings is of the "independent" type, usually consisting of three set-screws in the wall of a sleeve or flange. The holder 11 here shown, however, is a three-jaw universal chuck, with jaws convergently movable to grip the periphery of the coupling, as mentioned before. Instead of the usual short jaws, bearing their full lengths on one end only of the coupling C, the chuck 11 shown in Figs. I and II has long jaws 48 extending substantially the full axial length of the coupling C, but bearing on the latter only adjacent its ends, as indicated at 49. This makes it possible to properly center and align in the chuck 11 any coupling C not so obviously imperfect that it should be rejected by the machinist, without any attempt to work on it,—if such a coupling should by any accident pass inspection at the forging plant. With such a universal chuck 11, the centering of the coupling requires only a few seconds, as against many minutes often required in repeatedly centering couplings in ordinary work-holders such as above mentioned.

Fig. IV illustrates the adaptation of a single lathe to perform all the operations of boring, counter-boring or chamfering, and threading couplings, without change of tools. In this figure, various parts have been marked with the same reference characters as in Figs. I to III, as a means of dispensing with mere repetitive description.

Instead of the single boring-bar 26 shown on the carriage 12 in Fig. I, Fig. IV shows a plurality of such bars or heads, so mounted as to be shiftable to operating position or out of the way as desired. For this purpose, the bars are here shown mounted on a turret structure 50 rotatable horizontally about a central axis secured to the rest of the carriage 12 (not shown in Fig. IV) by a clamping bolt 51. The turret 50 may be secured in proper position to align any of its heads with the axis of revolution of the chuck 11 by the usual or any suitable means, such as indicated at 52. Two bars 26a, 26b located diametrically opposite one another in Fig. IV are shown with boring cutters 25a, 25a and chasing cutters 25b, 25b, respectively. Another head 26c is shown with a counter-boring cutter 53. As shown, the operating handles 37 for the cutter holder actuating screws 36 of the various boring bars are arranged on the upper sides of the bars (instead of on their ends as in Figs. I to III) and connected to the screws by bevel gearing 54. There is also a fourth head 56, equipped with any suitable type of collapsible tap 57. As shown, the heads 26c, 56 are arranged diametrically opposite one another, at right angles to the heads 26a, 26b.

With this arrangement, both ends of a coupling C are first bored (concurrently) with the head 26a. Then the head 26c is brought to operating position, and the outer end of the coupling C is counter-bored, as shown in Fig. IV. After this, the chasing head 26b is brought to operating position, and the ends of the coupling are concurrently threaded; and then the tapping head 56 is brought to operating position and the outer end of the coupling is tapped. After this, the coupling C is turned end for end and reclamped in the chuck 11, and its other end (that was formerly the inner one) is counter-bored and tapped with the heads 26c and 56. Extremely careful recentering of the coupling C in the chuck 11 for these last operations is not necessary, since extreme nicety of alignment as between the counter-bores at the ends of the coupling is unimportant, and since the standard taps 57 are usually constructed to be self-adjusting to compensate for slightly imperfect alignment.

While the head 26c used for counter-boring need not, of course, be a counterpart of the heads 26a and 26b, as here shown, it is nevertheless convenient to make it like them, since this allows a different sequence of operations to be performed, if desired.

Having thus described my invention, I claim:

1. A method of concurrently cutting opposite tapers in a pipe coupling on a machine comprising lathe-ways, a revolving coupling-holder with axis of rotation parallel to said ways, carrier means movable along said ways, and means for feeding the same cross-wise of the ways in definite relation to its movement along them; which method comprises feeding through the two ends of the coupling, by and with the carrier means, oppositely pointing cutters in such positions on the carrier means that their radial distances from the coupling-holder axis vary oppositely as the carrier means moves along and across the lathe-ways as aforesaid.

2. A method according to claim 1, in combination with the further steps of concurrently chasing the two ends of the coupling in the same manner as the cutting set forth in claim 1, without necessity for disturbing the setting of the coupling in the holder, and then successively tapping the two ends of the coupling.

3. A method according to claim 2 which further comprises counterboring one end of the coupling before taper-boring and chasing the coupling as set forth, and counterboring its other end before tapping the same but after tapping the first end.

4. The combination with lathe-ways, a revolving coupling-holder with axis of rotation parallel to said ways, carrier means movable along said ways, and means for feeding the same cross-wise of the ways in definite relation to its movement along them, of cutters for the two coupling ends on said carrier means in such positions that their radial distances from the coupling-holder axis vary oppositely as the carrier means moves along and across the lathe-ways as aforesaid.

5. Apparatus as set forth in claim 4 having as its coupling holder a chuck comprising convergently movable jaws with bearing for convergently gripping the periphery of the coupling at its ends only.

6. The combination with lathe-ways, a revolving coupling-holder with axis of rotation parallel to said ways, carrier means movable along said ways and means for feeding the same cross-wise of the ways in definite relation to its movement along them, of a boring bar on said carrier with cutters for the two coupling ends at opposite sides of the bar, so as to cut opposite tapers when the bar is fed through the coupling by said carrier means.

7. The combination with lathe-ways and a revolving work holder with axis of rotation parallel to said ways, of a boring bar with cutters at different positions therealong and at opposite sides thereof, means for feeding the bar obliquely along and across the ways, so as to cut opposite tapers in the work concurrently, and means for retracting the cutters into the bar after a cut; thus facilitating withdrawal of the bar from the work.

In testimony whereof, I have hereunto signed my name at Philadelphia, Pennsylvania, this 14th day of February, 1925.

JOHN J. BUCKLEY.